US005770292A

United States Patent [19]

Shimamura et al.

[11] Patent Number: 5,770,292

[45] Date of Patent: Jun. 23, 1998

[54] JOINT ASSEMBLY OF A LEADER AND A FILM AND SPLICER FOR MAKING THE SAME

[75] Inventors: Yasunobu Shimamura; Masayuki Kobayashi; Takuya Yamamoto, all of Wakayama, Japan

[73] Assignee: Noritsu Koki Co., Ltd., Wakayama, Japan

[21] Appl. No.: 818,677

[22] Filed: Mar. 14, 1997

Related U.S. Application Data

[62] Division of Ser. No. 399,214, Mar. 6, 1995, Pat. No. 5,651,854.

[30] Foreign Application Priority Data

Mar. 4, 1994 [JP] Japan .................................... 6-34800

[51] Int. Cl.$^{6}$ .................................................. B32B 3/02

[52] U.S. Cl. ............................ 428/57; 428/61; 428/192; 156/157; 156/304.3

[58] Field of Search ................................ 428/57, 58, 61, 428/192; 157/157, 304.3, 505, 513

[56] References Cited

U.S. PATENT DOCUMENTS

| | | | |
|---|---|---|---|
| 4,166,300 | 9/1979 | Savich | 156/513 X |
| 4,457,964 | 7/1984 | Kaminstein | 428/192 X |
| 4,847,131 | 7/1989 | Ban | 428/192 X |
| 4,937,117 | 6/1990 | Yu | 428/57 |
| 5,078,828 | 1/1992 | Marglin . | |
| 5,123,992 | 6/1992 | Kanda et al. . | |
| 5,279,696 | 1/1994 | Zangenfield et al. . | |
| 5,318,818 | 6/1994 | Sjostrom | 428/192 X |
| 5,354,408 | 10/1994 | Otomine et al. . | |
| 5,455,136 | 10/1995 | Yu et al. | 428/57 X |
| 5,656,125 | 8/1997 | Tanaka | 156/505 X |

FOREIGN PATENT DOCUMENTS

| | | | |
|---|---|---|---|
| 1008846 | 5/1957 | Germany | 428/192 |
| 26 41 373 | 3/1978 | Germany | 156/502 |
| 551217 | 2/1943 | United Kingdom | 156/157 |

*Primary Examiner*—Mark A. Osele
*Attorney, Agent, or Firm*—Wenderoth, Lind & Ponack, L.L.P.

[57] ABSTRACT

There is a splicer bed 1 having a leader support 3 arranged on the top thereof. One opening 6 is provided in one end of the leader support 3. A knife mounting base 7 is arranged to project from the opening 6 and provided at one end with a cartridge holder 8. The knife mounting base 7 also has a leader positioning head 10 provided on the other end thereof for determining the position of a leader L. A stationary knife 11 is mounted to the leader positioning head 10. A movable knife 12 is mounted for pivotal movement to the stationary knife 11. A film holddown plate 17 is pivotably mounted to the knife mounting base 7. The knife mounting base 7 is also provided with a pair of punches 28 which are arranged slidable and can be lowered by the film holddown plate 17. In action, before the leading portion of a film F drawn out from a film cartridge P loaded in the cartridge holder 8 is held under the film holddown plate 17, the downward movement of the film holddown plate 17 causes the punches 28 to cut two notches in both side edges of the film F. The leading portion of the film F is trimmed by the downward action of the movable knife 12 and then joined by a strip of splicing tape to the leader L placed on the leader support 3.

1 Claim, 6 Drawing Sheets

JOINT ASSEMBLY OF A LEADER AND A FILM AND SPLICER FOR MAKING THE SAME

This is a divisional application of Ser. No. 08/399,214, filed Mar. 6, 1995 now U.S. Pat. No. 5,651,854.

BACKGROUND OF THE INVENTION

The present invention relates to a joint assembly of a leader and a photographic film for ease of the film being transferred to a development station as guided with the leader and to a splicer for making the joint assembly.

In a common automatic photographic film development apparatus using a leader transfer system, a leader L is joined at its trailing end to the leading end of a film F fed out from a cartridge (not shown) by a strip of splicing tape T, as shown in FIG. 7(A), so that the film F is passed through the development apparatus as guided with the leader L.

The leader L is made of a flexible resin material sheet having a row of square perforations a provided at equal intervals in one edge thereof for engagement with a sprocket of the development apparatus lengthwisely of the film F.

A leading portion of the film F with the leader L is separated off by cutting along the line denoted by C in FIG. 7(A) after the development process of the film F. The remaining film F less the leader L is then fed into a negative film mask in the exposure station of a printer machine.

For removing the leader L, the leading portion of the film F is cut at a right angle to the feeding direction. Hence, the resultant leading end of the remaining film F has a pair of square corners D as shown in FIG. 7(B). When the leading end of the film F is directly inserted into the negative film mask, its square corners may possibly be deflected and bent causing jamming in the negative film mask of the exposure station. This will prevent smooth running of the film F through the printer machine.

It is thus a first object of the present invention to provide an improved joint assembly of a leader and a film for ease of the film being transferred and passed smoothly through a negative film mask.

It is a second object of the present invention to provide a splicer for making with ease such a joint assembly of a leader and a film that the film can be transferred without jamming.

SUMMARY OF THE INVENTION

For accomplishing the first object of the present invention, a joint assembly of a leader and a film fabricated by joining a leading end of the film to a trailing end of the leader made of a flexible material is provided in which the film has a pair of notches provided at both sides of a leading portion thereof for ease of separation after development process of the film.

For achieving the second object of the present invention, a splicer for making a joint assembly is provided comprising: a splicer bed having a leader support arranged on the top thereof, the leader support having an opening provided in one end thereof; a knife mounting base arranged to project from the opening and having a cartridge holder disposed on one end thereof for holding a film cartridge and having a leader positioning head provided on the other end thereof for determining the placement of the leader on the leader support; a stationary knife mounted to a lower of the leader positioning head; a movable knife mounted for pivotal movement to the stationary knife so that both the knives can cut off the leading portion of the film; a film holddown plate pivotably mounted to the knife mounting base for holding down the leading portion of the film drawn out from the film cartridge loaded in the cartridge holder towards the leader support; and a pair of punches accommodated in two pin holes provided in the knife mounting base beneath the film holddown plate and remaining urged upwardly by biasing members so that when the film holddown plate is lowered, it presses down the two punches which in turn produce two notches respectively in the leading portion of the film.

According to the above first embodiment of the present invention, the film is separated from the leader after the development process by cutting the leading portion of the film between the two notches. As the result, a cutting end of the film has two corners not squared but rounded thus ensuring smooth feeding and transfer of the film.

According to the second embodiment of the present invention, the leading portion of the film drawn out from the film cartridge loaded in the cartridge holder is trimmed by the pivotal downward movement of the movable knife across the stationary knife while it is securely held under the film holddown plate.

Before the film holddown plate has been lowered to hold the leading portion of the film, it presses down the two punches. More specifically, the two notches of the leading portion of the film are produced by the punches during the downward movement of the film holddown plate which can be synchronous with the downward movement of the movable knife.

After trimming of the film, the leader is placed in position on the leader support. As the leader stays in direct contact with the leader positioning head, it is joined to the leading end of the film by a strip of splicing tape thus forming a joint assembly of the leader and the film.

DETAILED DESCRIPTION OF THE PREFERRED EMBODIMENTS

Figure 1:
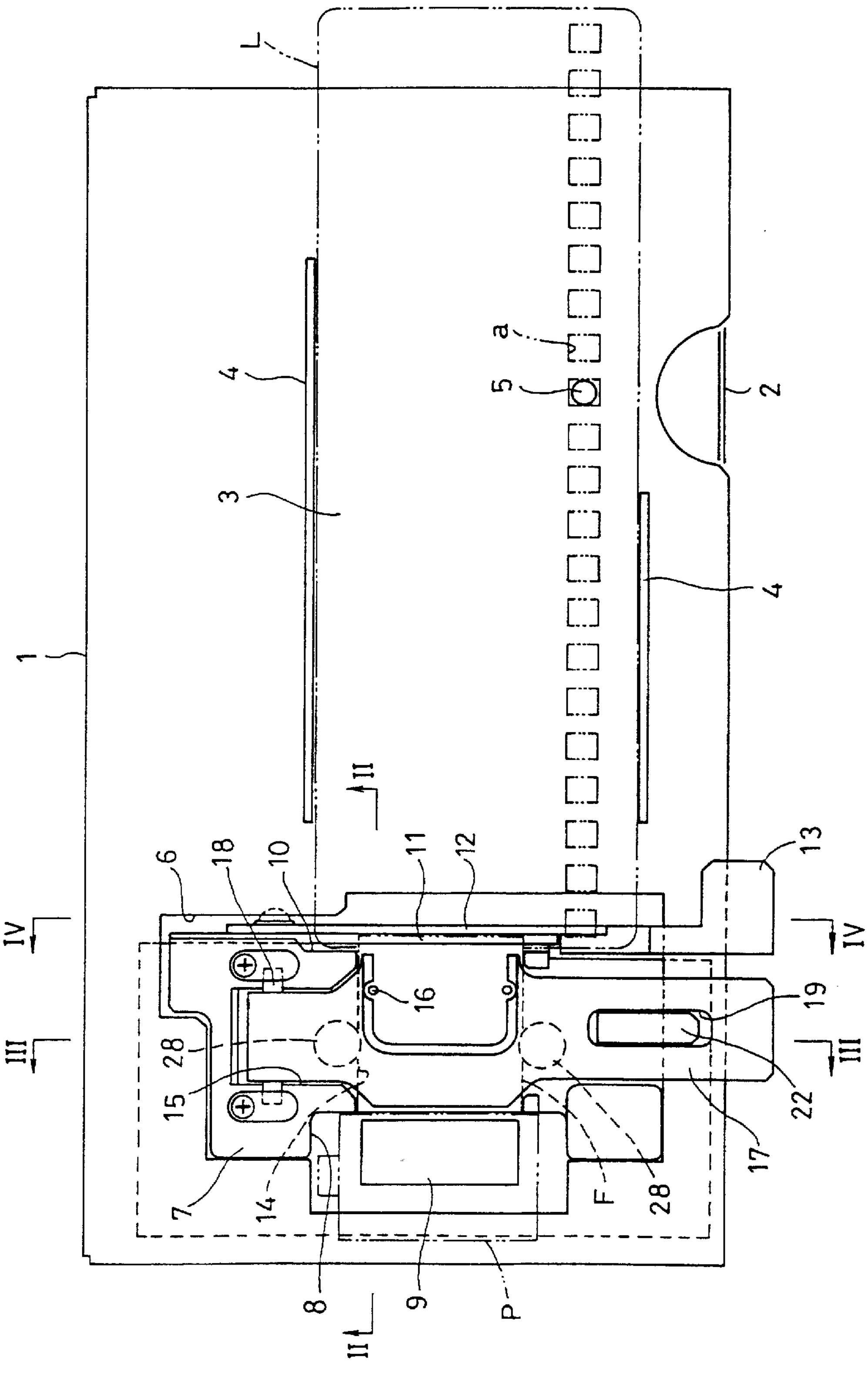
FIG. 1 is a plan view of an embodiment of a splicer according to the present invention.
Figure 2:
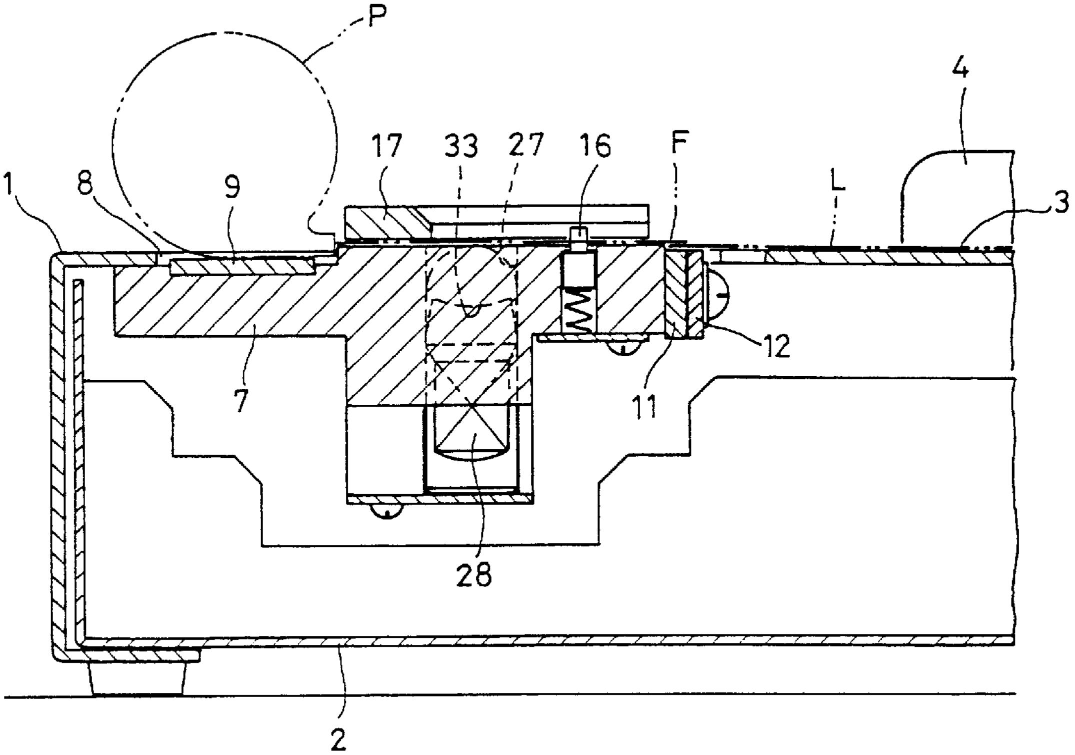
FIG. 2 is a cross sectional view taken along the line II—II of FIG. 1.
Figure 3:
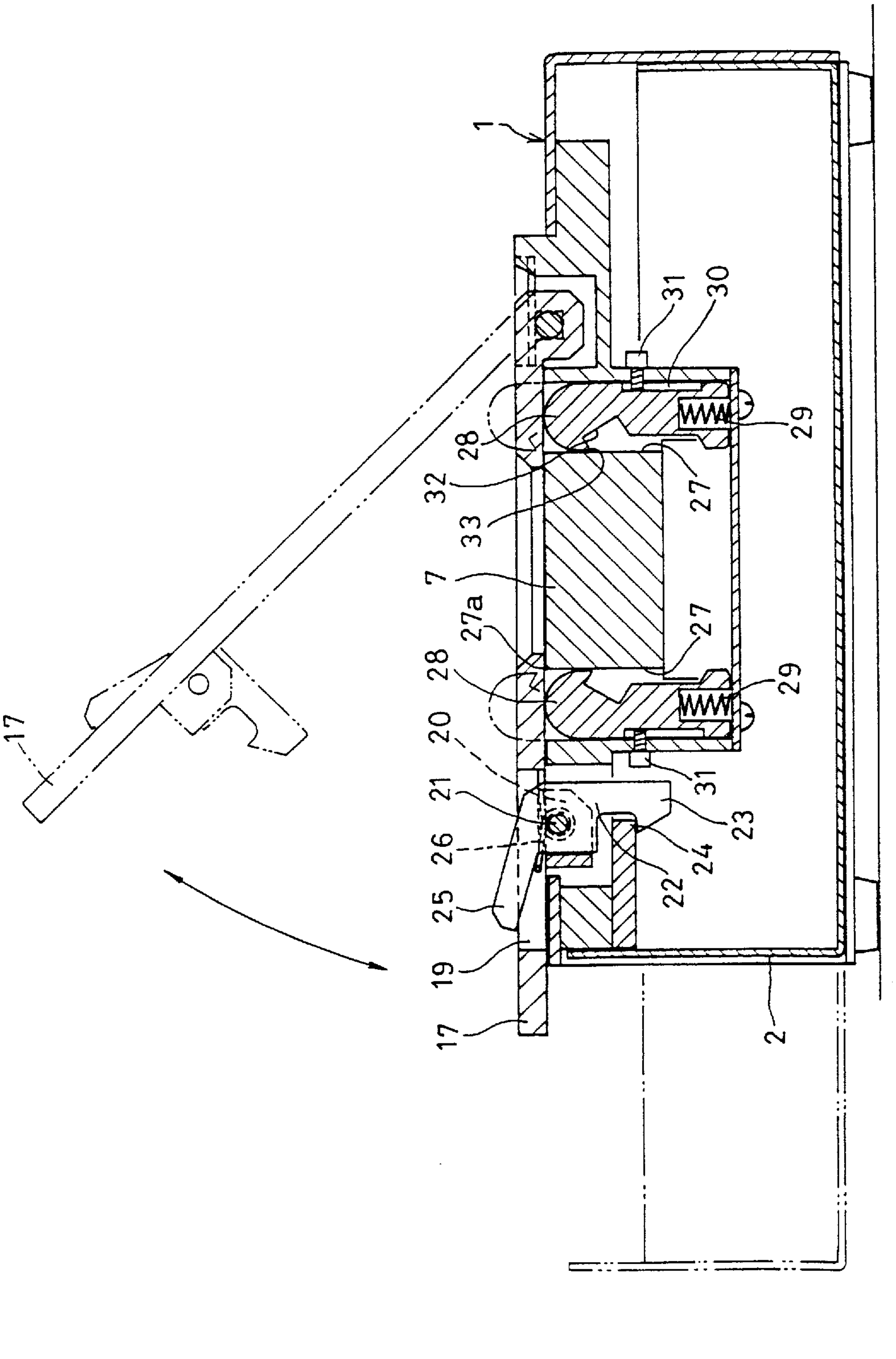
FIG. 3 is a cross sectional view taken along the line III—III of FIG. 1.
Figure 4:
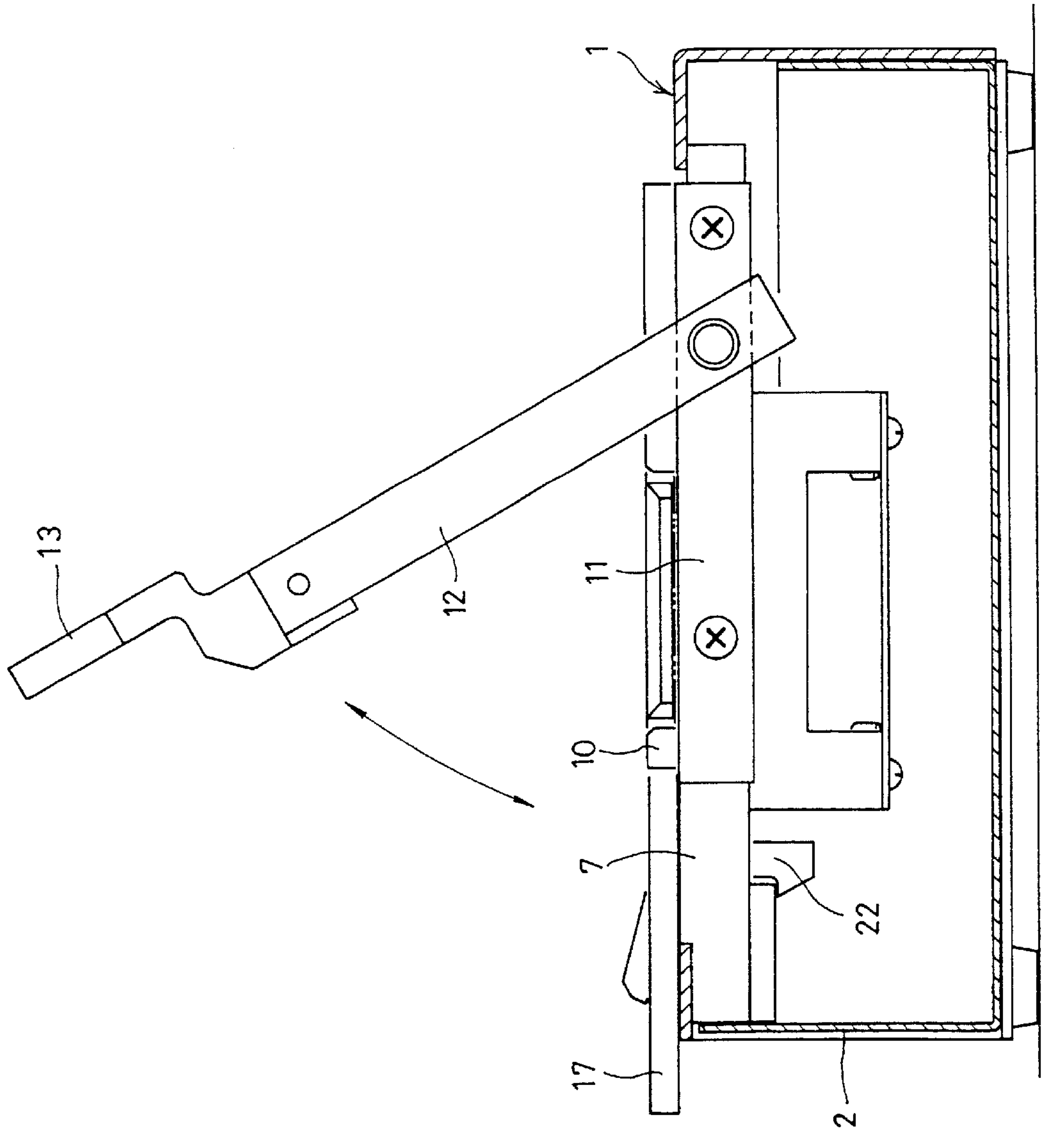
FIG. 4 is a cross sectional view taken along the line IV—IV of FIG. 1.

Preferred embodiments of the present invention referring to FIGS. 1 to 6.

As shown in FIGS. 1 to 4, a splicer bed 1 is formed of a box shape having two openings provided in a side and a bottom thereof and accommodating a slidable drawer 2 in an interior space thereof. The top surface of the splicer bed 1 serves as a leader support 3 on which a leader L is placed. Mounted on the leader support 3 are a pair of leader guides 4 of plate shape for positioning the leader L from both sides and a leader positioning pin 5 arranged engageable with each of a row of square perforations provided in one edge of the leader L.

The leader support 3 has at one end an opening 6 in which a knife mounting base 7 is accepted as fixedly mounted by screws or like to the splicer bed 1 so that its top is flush with the leader support 3.

The knife mounting base 7 has a recess in one side of the top thereof which serves as a cartridge holder 8. A magnet 9 is mounted in the bottom of the cartridge holder 8. A leader positioning head 10 is provided on the other end of the knife mounting base 7 for determining the setting location of a joint end of the leader L placed on the leader support 3.

A stationary knife 11 is mounted beneath the leader positioning head 10 and a movable knife 12 is mounted to one end of the stationary knife 11 for trimming a leading portion of a film F. The movable knife 12 has a handle grip 13 mounted to the distal end thereof.

The knife mounting base 7 has also a film recess 14 provided in the top thereof for accepting the film F drawn out from a film cartridge P held in the cartridge holder 8 and a holddown plate recess 15 provided in the same extending at a right angle to the film recess 14.

Figure 5:
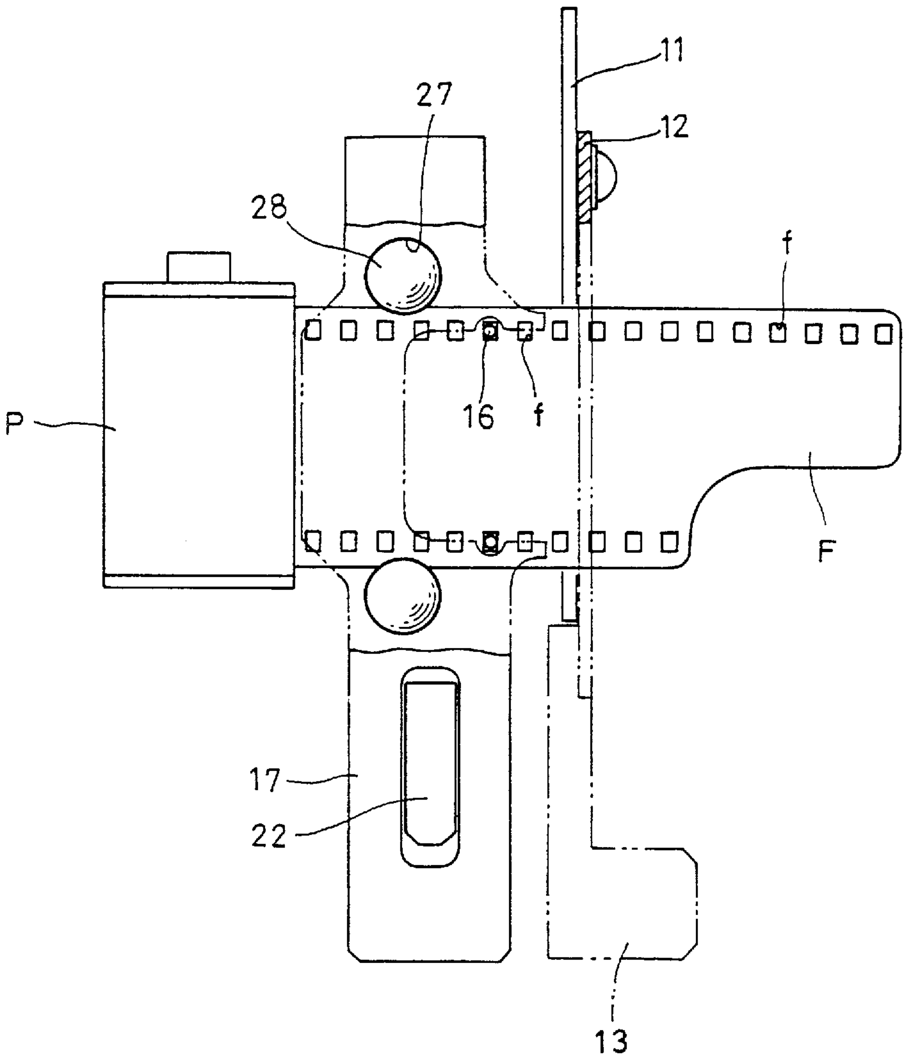
FIG. 5 is a plan view showing notches provided in a film.

A pair of film positioning pins 16 are mounted in the film recess 14 for engagement with two rows of perforations f respectively arranged in both edges of the film F, as best shown in FIG. 5.

A film holddown plate 17 is located in the holddown plate recess 15 and pivotably mounted at one end by a pin 18 to the knife mounting bed 7.

The film holddown plate 17 has a slot 19 provided in the other end thereof for allowing the pivotal movement of a latch 22. For the pivotal movement, the latch 22 is mounted by a pin 21 between a pair of supports 20 which are located on both sides of the slot 19.

The latch 22 has a hook portion 23 provided at one end thereof for engagement with a receptor 24 mounted to a lower of the splicer bed 1. When the hook portion 23 is engaged with the receptor 24, the film holddown plate 17 presses against the leading end of the film F in the film recess 14.

The latch 22 also has an operating portion 25 provided at the other end thereof for movement across the slot 19. When the operating portion 25 is depressed, the latch 22 performs a pivotal action thus disengaging its hook portion 22 from the receptor 24. The latch 22 remains urged by a spring 26 so that its hook portion 23 engages with the receptor 24.

A pair of punch openings 27 are provided in the bottom of the holddown plate recess 15 so that their opening edges act as notching blades 27*a*. Each of the punch openings 27 accommodates a punch 28 which is lowered by the downward movement of the film holddown plate 17. The punch 28 remains urged upwardly by a biasing member 29.

The punch 28 has an axially extending guide recess 30 provided in a side wall thereof. A pin 31 is inwardly mounted to fit in the guide recess 30 so that the punch 28 is prevented from slipping out from the punch opening 27. More specifically, when the punch 28 comes to its upper limit of movement, it is directly held at the lower end of its guide recess 30 by the pin 31.

The punch 28 also has a deep recess 32 provided therein, deep enough to clear the film F, forming a punch blade 33 which comes out of the punch opening 27 when the punch 28 is at its uppermost location.

After the film cartridge P is loaded into the cartridge holder 8, the film F is drawn out from the film cartridge P. The film F is then placed in the film recess 14 with the film positioning pins 16 setting in the perforations f of the film F. While the film holddown plate 17 being lowered, it presses down the two punches 28. Accordingly, the punches 28 cut out semicircular notches b in both edges of the film F respectively (See FIG. 5).

When the film holddown plate 17 comes down to press the film F against the bottom of the film recess 14, the hook portion 24 of the latch 22 engages with the receptor 24. As the result, the film F is held securely under the film holddown plate 17.

While the film F being held, its leading portion is separated by a cutting action of the movable knife 12 and the stationary knife 11.

During the cutting action, the film F remains held under the film holddown plate 17 as prevented from deflected. This produces an accurately square cutting end of the film F.

Figure 6A:
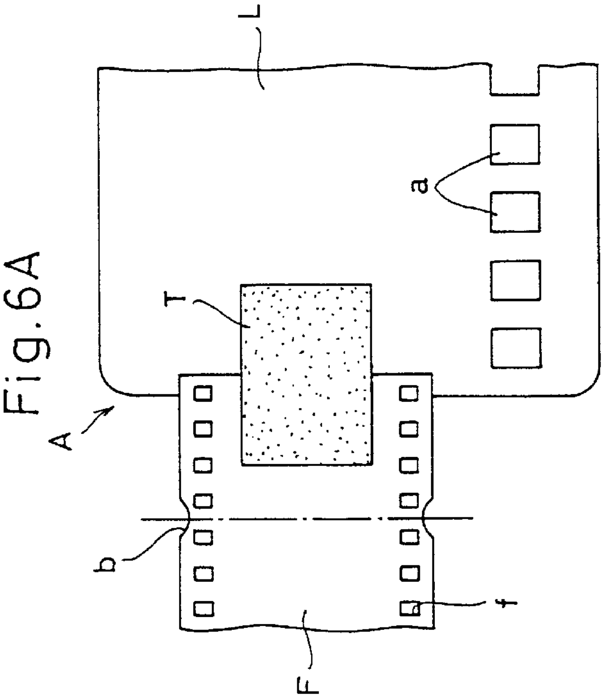
FIGS. 6(A) and 6(B) are plan views showing a joint assembly of a leader and a film and a remaining portion of the film less a removed leading portion respectively.

Then, the leader L is placed on the leader support 3 with its joint end directly facing the leader positioning head 10. Simultaneously, the leader positioning pin 5 is located in one of the square perforations a of the leader L. After a strip of splicing tape T is bonded between the film F and the leader L, a joint assembly A shown in FIG. 6(A) is formed.

During the bonding of the tape T between the film F and the leader L, both the film F and the leader L are not dislocated but secured in their relative locations. This ensures the bonding with accuracy.

Figure 6B:
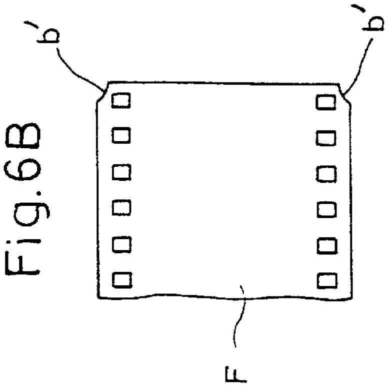
Figure 7A:
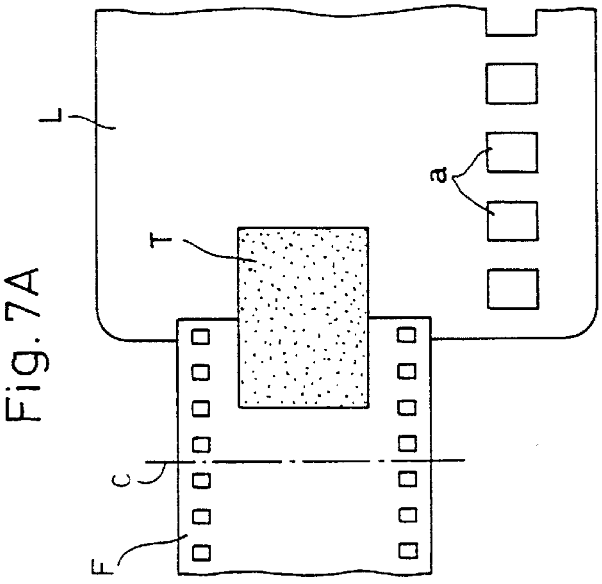
Prior Art Fig. 7A
FIGS. 7(A) and 7(B) are plan views showing a prior art joint assembly of a leader and a film and a remaining portion of the film less a removed leading portion respectively.
Figure 7B:
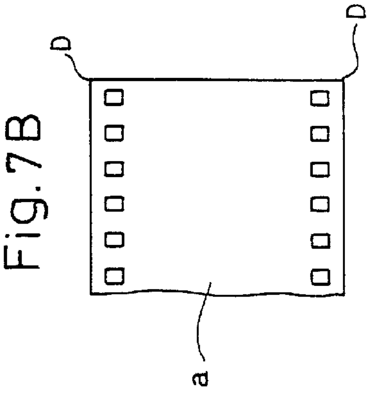
Prior Art Fig. 7B

The film F with the leader L is transferred as guided with the leader L to a film development apparatus. When the film F has been subjected to a development process, it is separated from the leader L by cutting between the two notches b. As the result, a cutting end of the film F has two blunt corners b' as shown in FIG. 6(B). Accordingly, the film F will be loaded to a negative film mask for printing with its leading end kept free from bending or jamming as is inserted smoothly without difficulty.

The blunt corners b' of the leading end of the film F are not limited to the shape of the embodiment shown in FIG. 6(B) but any appropriate shape will be employed with equal success corresponding to the shape of the notching blade 27*a*.

What is claimed is:

1. A joint assembly of a leader and a film fabricated by joining a leading end of the film to a trailing end of the leader made of a flexible material, characterized in that the film has a pair of notches provided at both sides of a leading portion thereof for ease of separation after development process of the film.

* * * * *

UNITED STATES PATENT AND TRADEMARK OFFICE

CERTIFICATE OF CORRECTION

PATENT NO. : 5,770,292

DATED : June 23, 1998

INVENTOR(S) : Yasunobu SHIMAMURA et al.

It is certified that error appears in the above-indentified patent and that said Letters Patent is hereby corrected as shown below:

Title page, item [54] and

Column 1, line 2, delete "AND SPLICER FOR MAKING THE";

line 3, delete "SAME";

line 18, change "as" to --while being-- and change "with" to --by--;

line 25, delete "off";

line 45, after "film" insert --so--;

Line 65, change "to a lower" to --below--.

Column 2, line 10, delete "respectively";

line 11, delete "above first embodiment of the";

line 17, delete "second embodiment of the".

Column 3, line 2, change "as" to --and--;

line 35, delete "to a";

line 36, change "lower of" to --beneath--;

line 47, after "in" insert --base 7 at--.

CERTIFICATE OF CORRECTION

PATENT NO. : 5,770,292
DATED : June 23, 1998
INVENTOR(S) : Yasunobu SHIMAMURA et al.

It is certified that error appears in the above-indentified patent and that said Letters Patent is hereby corrected as shown below:

Column 4, line 8, change "setting" to --fitting--;

line 9, after "17" insert --is--;

line 12, change "FIG. 5" to --FIGS. 5 AND 6(A)--;

line 15, change "24" (first occurrence) to --23--;

line 16, change "the" (first occurrence) to --a--;

line 18, after "F" insert --is--;

line 23, change "as" to --and is-- and after "from" insert --being--;

line 24, after "cutting" insert --of the--;

line 34, after "but" insert --are--;

line 43, change "as is" to --, since it can be--;

line 48, change "will" to --can--;

line 54, change "characterized in that the" to --wherein said--;

UNITED STATES PATENT AND TRADEMARK OFFICE

CERTIFICATE OF CORRECTION

PATENT NO. : 5,770,292

DATED : June 23, 1998

INVENTOR(S) : Yasunobu SHIMAMURA et al.

It is certified that error appears in the above-indentified patent and that said Letters Patent is hereby corrected as shown below:

Column 4, line 56, after "after" insert --a--;

line 57, change "the" to --said--.

Signed and Sealed this

Fourth Day of April, 2000

Attest:

Q. TODD DICKINSON

*Attesting Officer*

*Director of Patents and Trademarks*